W. DAVIES.
COOKING APPARATUS.
APPLICATION FILED SEPT. 17, 1921.

1,438,223.  Patented Dec. 12, 1922.
5 SHEETS—SHEET 1.

Inventor
Wayne Davies
By Mason, Fenwick & Lawrence
Attorneys

W. DAVIES.
COOKING APPARATUS.
APPLICATION FILED SEPT. 17, 1921.

1,438,223.

Patented Dec. 12, 1922.
5 SHEETS—SHEET 2.

Inventor
Wayne Davies

By Mason, Fenwick & Lawrence
Attorneys

W. DAVIES.
COOKING APPARATUS.
APPLICATION FILED SEPT. 17, 1921.

1,438,223.

Patented Dec. 12, 1922.
5 SHEETS—SHEET 4.

Inventor
Wayne Davies
By Mason, Fenwick & Lawrence
Attorneys

Patented Dec. 12, 1922.

1,438,223

UNITED STATES PATENT OFFICE.

WAYNE DAVIES, OF ATLANTA, GEORGIA.

COOKING APPARATUS.

Application filed September 17, 1921. Serial No. 501,247.

*To all whom it may concern:*

Be it known that I, WAYNE DAVIES, a citizen of the United States, residing at Atlanta, in the county of Fulton and State of Georgia, have invented certain new and useful Improvements in Cooking Apparatus; and I do hereby declare the following to be a full, clear, and exact description of the invention, such as will enable others skilled in the art to which it appertains to make and use the same.

This invention relates to cooking apparatus, and more particularly to apparatus of the type wherein a cooking utensil or receptacle, such as a waffle iron, double broiling pan or iron, or the like, is subjected to contact with flame on both sides at once.

The general objects of this invention are to enable food to be broiled or similarly cooked in broiling pans, or like cooking utensils, with complete combustion and economy of fuel; to concentrate the heat upon the utensil and distribute it evenly on both sides thereof; to avoid excessive heat on the hinge joints of a double pan; to conserve the flavor of the food; to avoid burning of the fat or other drippings from the food; to facilitate manipulation of the cooking utensil; to facilitate and render more efficient the operations of cooking, provide increased conveniences for the cook, and otherwise to improve the art of broiling, or other cooking, as will more fully appear in the ensuing detailed description.

In order to achieve the objects of my invention I have devised an apparatus having a cooking chamber provided with heating means such as gas jets in its opposite side walls, in combination with a broiling or like cooking utensil adapted to be inserted and sustained in said chamber. And my invention consists in the combination of said cooking chamber with a double broiling pan or the like, and in the several combinations, subcombinations, and details more fully set forth hereinafter, illustrated in the drawings and defined in the appended claims.

In the accompanying drawings in which like reference characters indicate like parts throughout the several views.

Figure 1:
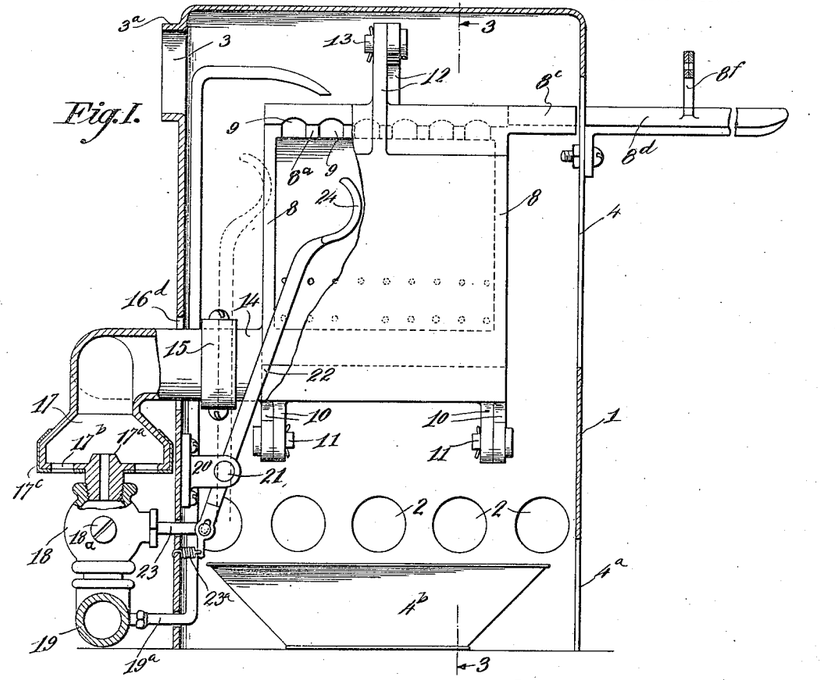
Figure 1 is a side elevation of a cooking apparatus constructed in accordance with my invention, parts thereof being broken away and illustrated in cross section.
Figure 2:
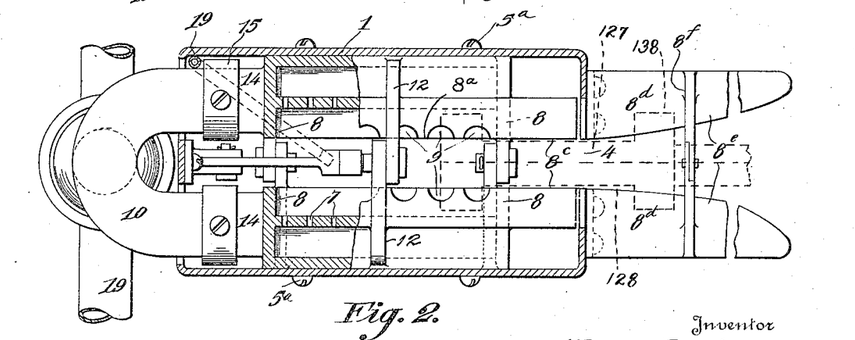
Figure 2 is a top plan view, parts thereof being broken away and illustrated in cross section and indicating in dotted lines a broiling receptacle entering the cooking chamber.

Referring first to the heat generating and heat applying or cooking apparatus which I have illustrated in Figs. 1 to 4 as embodying in part the principles of my invention:

Numeral 1 indicates a shell or casing, preferably of sheet metal, having a plurality of air ports 2 in the lower portion of its side walls, an opening 4ᵃ in the lower portion of its front wall to permit the insertion or removal of a drip pan 4ᵇ, suitable openings in its rear wall for the passage of fuel pipes and a valve stem, and a vent or flue opening 3, in the upper part of said rear wall, the vent being preferably surrounded by a flange 3ª, to which a pipe may be connected for carrying fumes and products of combustion to a chimney or stack directly or through a suitable manifold. The casing 1 is also provided with an opening 4, in its front wall, adapted to permit the insertion and removal of a cooking receptacle of the type to be hereinafter described.

Figures 3, 4:
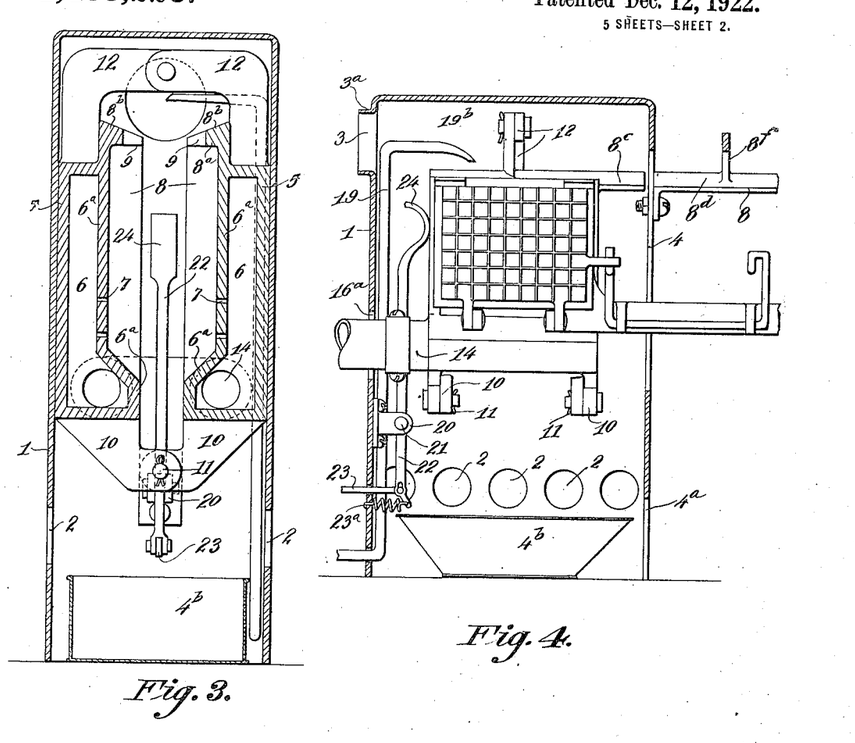
Figure 3 is a vertical sectional view taken on the line 3—3 of Figure 1.
Figure 4 is a vertical longitudinal section through the oven showing a broiling utensil in cooking position.

Disposed within the shell or casing 1 are combined burner and cooking chamber members comprising a pair of similar hollow bodies 5, preferably of cast iron, held fixedly in spaced relation facing each other. Said bodies 5 are shown as dished, rectangular members each having a fuel-mixture receiving chamber 6, the inner wall 6ª of which has burner orifices shown as a series of perforations 7, extending longitudinally below the horizontal center line, through which the gaseous fuel mixture issues from the chamber in jets. Walls or flanges 8 project inward at front and rear of bodies 5. A top wall or flange 8ª, having notches 9 in its edge and a top surface 8ᵇ sloping downward toward the central space, extends inward to the plane of the edges of the walls 8. Continuations 8ᶜ of said flanges 8ª overhang the forward walls 8 and extend nearly to the front of the casing. The lower edges of the chambers 6 extend also inward at 6ª to the same planes as flanges 8, 8ª forming enlarged spaces at the lower end of each chamber from which projects rearward a gas inlet connection 14. There is thus formed, between the two members 5, a cooking chamber in which the gaseous mixture issuing from the burner openings 7 is burned. A broiling pan or similar cooking receptacle, to be presently described, occupying the space between the flanges of said members 5 may be subjected on both sides to flames of the ignited gas issuing from the burner openings 7. The burning and burnt gases are concentrated on the sides of the broiling pan by the flanges and finally escape, through the notches 9 in the upper flanges 8ª, in direct contact with the sides of the broiling pan. The notches 9 are intended to be of such size as to somewhat restrict the upward flow of burning and burnt gases and cause them to eddy within the cooking chamber for the purpose of distributing heat over the sides of the broiling pan and concentrating it thereon. By reason of the proportions and positions of the fuel mixture chambers 6 with respect to the cooking chamber the mixture in said chambers 6 will be heated by the flames in the cooking chamber before it issues from the orifices 7 and thereby be brought to a condition to be more completely burned.

The two members 5 are held fixedly in spaced relation by the downward and inward projecting overlapped arms or lugs 10, secured together by bolts 11 at the lower edges, and by the upward and inward extending overlapped arms or lugs 12, secured together by bolt 13, at the upper edges. The arms or lugs 10, arranged substantially at the opposite lower corners of the casings 5, are depressed sufficiently to clear the lower edge of the broiling utensil and its parts, while the upper arms 12, bridged across the top of the members 5, afford abundant clearance for the broiler iron, as will subsequently appear. The members 5 may be secured to the inner sides of the side walls of the casing 1 by means of ordinary machine screws 5ª suitably tapped through the walls and into the outer sides of the members. They are accurately and rigidly spaced apart by the said arms 10 and 12, and may be readily disassembled by removing said screws 5ª, pins 11 and 13, and disconnecting the fuel conduits.

Spaced brackets or guides 8ᵈ may be secured to the casing 1, one at each side of the front opening 4. The upper surfaces of the guides 8ᵈ are substantially continuations of the upper surfaces of the extension flanges 8ᶜ. Their opposed edges 8ᵉ form a flaring guideway between them designed for the purpose of properly guiding a double broiling pan to the cooking chamber and forcing its sides together should it be charged with relatively thick food material. Guide brackets 8ᵈ are securely tied together and rigidly spaced by the brace 8ᶠ rising from each guide 8ᵈ from a point removed from its edge and bridging the space between at a height sufficient to afford clearance for the passage of sustaining lugs on a broiling iron. The brace may be in two overlapping parts or otherwise suitably formed. The brackets or guides 8ᵈ project from the casing 1 such a distance that a broiling iron may be sustained thereon and on the flanges 8ª in idle position without holding the gas control lever 22 in position to maintain the gas valve open in the manner to be hereinafter described.

Coupled to the said fuel inlet connections 14 on members 5 by couplings 15 is a branched conduit 16 affording communication between the mixing chamber 17 and the burner chamber 6. The bottom of the mixing chamber 17 has a central gas inlet nozzle 17ª surrounded by air ports 17ᵇ, the latter of which may be opened or closed or varied in size by means of a damper 17ᶜ. A mixture of combustible gas and air may therefore be delivered into the chambers 6, gas entering the mixing chamber from main 19 through valve casing 18, and air entering from the surrounding atmosphere through the air ports 17ᵇ. There may be a means, such as regulating screw 18ª, whereby to regulate the volume of gas normally admitted to the mixing chamber when the valve is open. The two limbs of the branched conduit 16 pass from the mixing chamber through suitable openings 16ᵃ in the rear wall of casing 1 to the burner chambers 6 of the members 5.

Projecting forward from the rear wall of casing 1, below the branched conduit 16, and in vertical planes substantially midway between the limbs of the said conduit, are parallel, spaced fulcrum supports 20 having alined perforations through which a pivot or fulcrum pin 21 extends. On pin 21 a lever 22 is fulcrumed. The lower end of lever 22 is loosely pivoted to the stem 23 of a suitable sliding valve adapted to open or close the passage through valve casing 18 from main 19 to the mixing chamber 17. The upper end of lever 22 is provided with an inward bowed, widened contact 24, which is disposed midway of the planes of the edges of the flanges 8, 8ᵃ, and which may move into or out of the space between the members 5 when the lever 22 is rocked upon its fulcrum 21. The convex surface of the contact end 24 is adapted to be engaged by the forward end of the broiler pan being inserted into the cooking chamber and to open the valve to admit fuel gas into the mixing chamber 17. Normally, the valve is held closed and the contact 24 advanced between the members 5 by a spring, which may be suitably mounted to bear upon the lever 22 or valve stem 23, and which is here illustrated as a coiled tension spring 23ᵃ having one end secured to the wall of casing 1 and its other end connected to the lower end of lever 22.

Suitably tapped into the main 19 is a small gas tube 19ᵃ that may extend upward within the casing 1 adjacent to its rear wall and then forward terminating in a tip 19ᵇ. Gas issuing from the tip 19ᵇ may be kept continuously burning to serve as a pilot flame to ignite the gas in the cooking chamber as it issues through the notches 9 when first turned on by the lever 22.

Figures 5, 6:
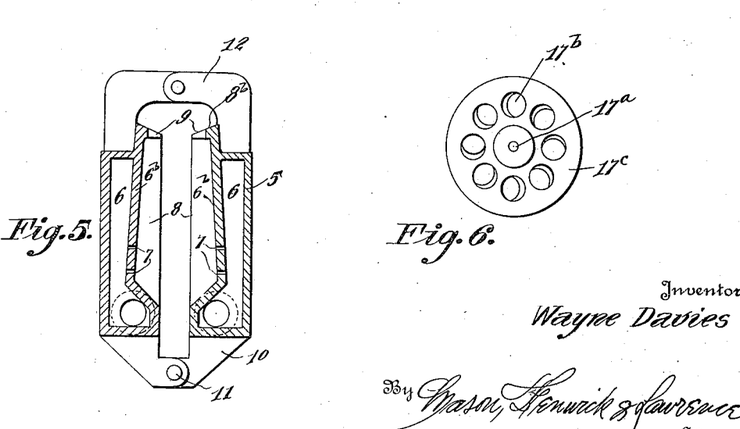
Figure 5 is a vertical cross section illustrating a slightly modified form of oven or cooking chamber.
Figure 6 is a plan of the damper for regulating the quantity of air entering the mixing chamber.
Figure 7:
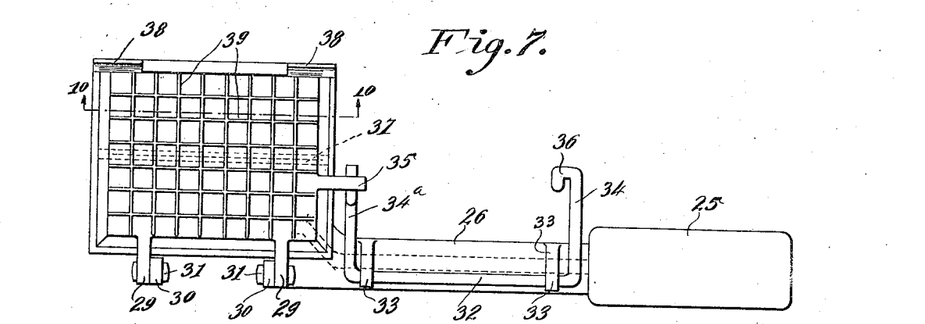
Figure 7 is a side elevation of a broiling utensil designed to be used with the oven.
Figure 8:
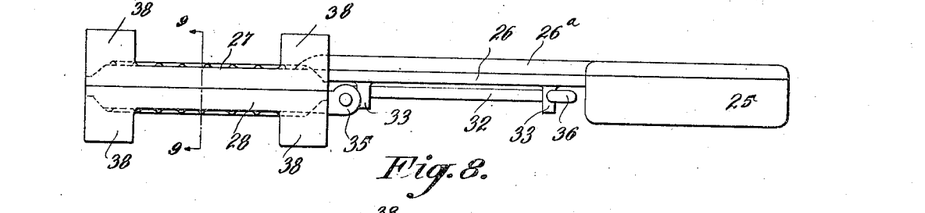
Figure 8 is a plan view of a broiling utensil of the form shown in Fig. 7 viewed from the edge opposite the hinges.
Figure 9:
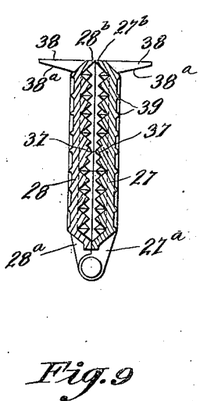
Figure 9 is a transverse sectional view taken on the line 9—9 of Figure 8.
Figure 10:
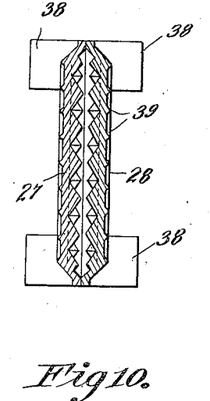
Figure 10 is a sectional view taken on the line 10—10 of Figure 7.

While I have shown the walls 6ᵃ of the members 5 extending parallel, in Figures 2 and 3, they may converge in an upward direction as illustrated in Figure 5 at 6ᵇ.

One form of cooking receptacle, broiler pan or "iron", used in connection with the apparatus previously described, is illustrated in Figures 7 to 10 inclusive. It comprises a pair of similar shallow pans 27 and 28 hinged together at one edge in any suitable manner. In the embodiment shown in Figs. 7 to 10 the said pans are made of cast iron, aluminum, or the like, and each has two cast-on hinge lugs 29 and 30, respectively, said hinge lugs being curved and perforated in such manner that when the pans are closed and in registration, the said lugs on the respective pans overlap and their perforations register. Pintle pins 31 passed through the perforated lugs complete the hinges. Each of said pans 27 and 28 is provided with plane, flat-faced flanges 27ᵃ and 28ᵃ on its hinged edge and on its front and rear edges; and with a sharp edged flange 27ᵇ or 28ᵇ, on the edge opposite the hinge 3; the said sharp edged flange being for the purpose of cutting off, when said pans are closed, any excess of material that may have been placed in the pans. The faces or inner surfaces of the pans 27 and 28 are provided with raised points or a relief design of any desired contour, the drawings showing a diamond pattern of four sided pyramidal points. A trade name, for example, may be formed in relief and impressed in the material contained between the pans. Extending longitudinally midway of each pan there may be a rib 37 of such depth that the ribs do not quite contact with each other when the pans are closed, thus dividing the interior of the receptacle into two halves, or the pans may be made without those division ribs. Each pan has lugs 38 disposed in any suitable position, preferably one projecting from each corner of its free edge at an angle to the plane of the pan. The under sides 38ᵃ of each lug 38 slopes inward from the end toward the surface of the pan and toward the hinged edge. When the utensil is in place within the cooking chamber the sloping sides 38ᵃ of the lugs 38 are the under sides and rest upon the flanges 8ᵃ so that the weight of the iron acting through the sloping lugs upon the said sloping flanges 8ᵃ tends to close the pans. Said lugs 38 may be so disposed as to project above the edges of the pans in order to drop them lower if desired. One of the said pans, such as 27, has formed with or secured to one of its corners a shank 26 which may be T-shaped in cross section, the rib 28ᵃ, representing the shank of the T, projecting to the right as shown. The end portion of the shank has a handle 25 of wood or other suitable heat insulating material attached to it. Perforated lugs 33 are formed on or attached to the wide flat face of the shank 26 opposite the rib 26ᵃ, said flat face occupying a plane parallel with the general plane of the pans, said lugs serving as bearings for an operating crank-rod 32 by means of which the pans 27 and 28 may be opened and closed. The end of rod 32 adjacent handle 25 is turned at right angles to form a crank 34 having a thumb or finger piece 36 at its extremity adapted to be moved by pressure of the thumb or fingers of the hand that grasp the handle 25. The opposite end of rod 32 is bent into a crank 34ᵃ the end of which passes through a hole in an ear or lug 35 formed on or secured to the pan 28. The axis of rod 32 is an extension of the axis of the hinge pintles, by preference, whereby manipulation of the crank 34 turns said rod 32 upon the axis of the hinges and readily opens or closes the pans 27 and 28.

In order to provide a large heat absorption surface on the outer side of each pan 27 and 28, elevations and depressions are preferably formed thereon. In Figs. 7 to 10, crossing ribs 39 are shown dividing the surface into rectangles. Any desired pattern of elevations and depressions, however, may be adopted for this purpose. A roughened surface also reduces loss of heat by reflection, and retards the upward flow of hot gases toward the venting openings 8$^b$ when the "iron" is in the oven.

Figure 11:
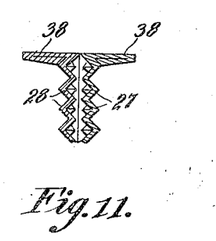
Figure 11 is a section through a fragment of a double broiling pan made of sheet metal.

Although I have referred to the pans 27 and 28 as made of cast metal they may be made of wrought metal and may be pressed from sheet steel, aluminum, or the like. When so manufactured there will be an intaglio pattern of depressions on the backs of the pans that are substantially counterparts of the relief pattern of points or bosses in their faces or inner sides as illustrated in Fig. 11.

The thickness or dimension from outside to outside of the two pans 27 and 28, when closed, should be somewhat less than the distance between the adjacent edges of the flanges 8$^a$. A difference of one quarter inch more or less may be allowed so that provision may be made for a limited opening of the pans due to the expansion of certain kinds of food when cooking. The distance between the edge having the lugs 38 and the hinged edge should be preferably equal to or somewhat greater than the distance from the flanges 8$^a$ to the lowest row of gas jet orifices 7; and the length of the said pans should be substantially the distance between the exterior surfaces of the flanges 8, so that when the iron is in the oven with the lugs 38 resting on the flanges 8$^a$, the flame spaces between the "iron" and the partitions 6$^a$ will be nearly closed at the ends.

The described apparatus is adapted for cooking various articles of food. It may be used, for example, for toasting bread or cooking waffles; and when pans having the rib 37 are used for this purpose the bread or waffles will be creased along its middle so that it may be folded to enclose sandwich filling material. A pan of this sort is also well adapted for cooking Vienna sausages or "Wienerwursten"; one "wiener" may be placed in each compartment so that two may be cooked at the same time. The points on the inner surfaces of the pan will press into or penetrate the casing of the "wiener", facilitating the cooking, while the hot metal in contact with both sides of the "wiener" inclosed in the pan will quickly sear the exterior and prevent escape of flavor. "Hamburg" steak may be similarly perfectly cooked in pans either with or without the central division ribs, as desired. When an "iron" or cooking receptacle has been charged with material to be cooked, and has been closed by means of the lever rod 32, it may be pushed endwise between the flaring edges 8$^e$ of the guide members 8$^d$ the lugs 38 passing above the flanges and being guided thereon. As the "iron" is moved toward the oven the flaring edges 8$^e$ will engage the sides and press them together, if the receptacle contains thick material such as "wieners." As the receptacle enters the oven, its forward edge will engage the contact member 24 on lever 22, and push the lever into a position to fully open the gas valve, thus admitting a combustible mixture into the burner chambers 6. The combustible mixture will be ignited by the small flame at the end of the pilot burner 19$^b$. In case meats or meat compositions such as "Hamburg" steak or "wieners" are being cooked the drip pan 4$^b$ should be disposed beneath the "iron" in order to catch the drippings. As the lower edge of the iron is slightly below the flame and in contact with cool air rising from below, the grease or other drippings will not be burned, nor will the hinges be injured by the heat. A limited expansion is permitted when waffles or other substances are being cooked, which tend to expand with heat, and steam or other vapors may be allowed to escape from between the pans, but the inclined under surfaces of the lugs 38 tend always to close the pans. Not only is air for purposes of combustion supplied from the mixer 17, but air also enters through the ports 2 and opening 4$^c$ near the bottom of the casing 1 and rises between the members 5 around the iron to supply additional air and insure complete combustion of the fuel gas in the flame or cooking chamber. The fumes and burnt gas pass up through the openings 9 and out through the flue orifice 3, which may be connected directly with a chimney pipe or, with other cooking units of a similar character, to a manifold leading to a chimney pipe. When the food has been properly cooked the iron may be withdrawn far enough to allow spring 23$^a$ to close the fuel inlet valve thus cutting off the supply of fuel. The "iron" may then rest suspended by lugs 38 on flanges 8$^a$ or 8$^c$ and brackets 8$^d$, until the food is required. The burner orifices 7 being disposed adjacent the lower portion of the partitions 6$^a$ gas will begin to burn at the bottom of the flame or cooking chamber, and the hot flame and gases will tend to rise, baffled to some extent by the roughness of the exterior of the pans and the flange 8$^a$ so as to afford increased opportunity for the flame and gases to impart their heat to the pans.

Figure 12:
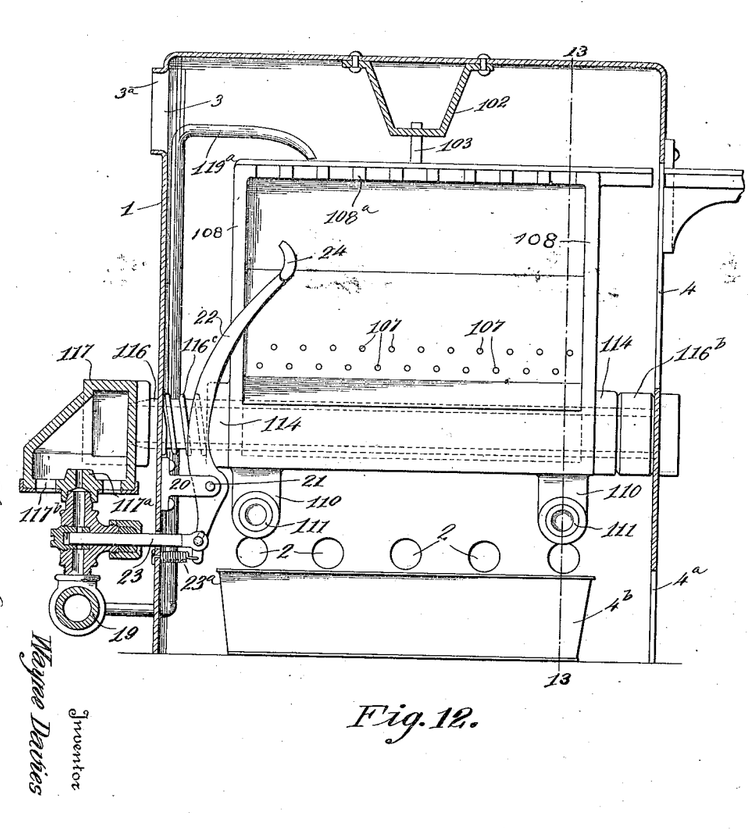
Figure 12 is a vertical, longitudinal section through another form of cooking apparatus embodying the invention.
Figure 13:
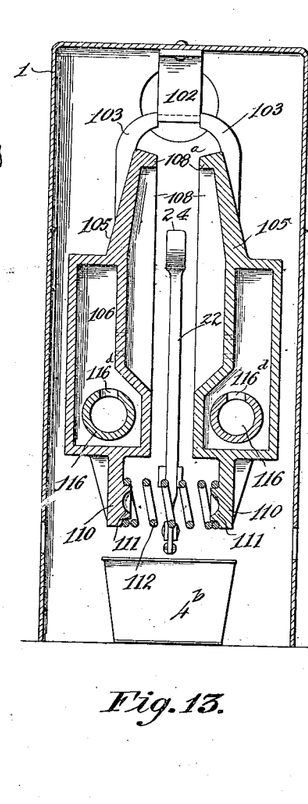
Figure 13 is a cross section on the line 13—13 of Fig. 12.
Figure 14:
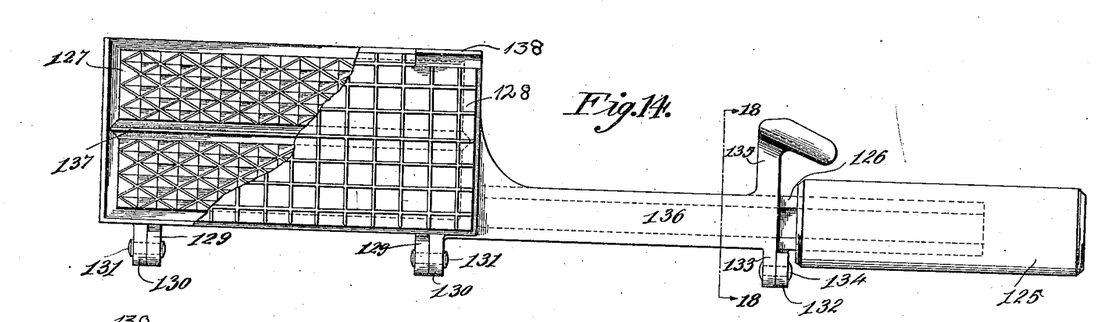
Figure 14 is an elevation of a preferred form of broiling utensil.
Figure 15:
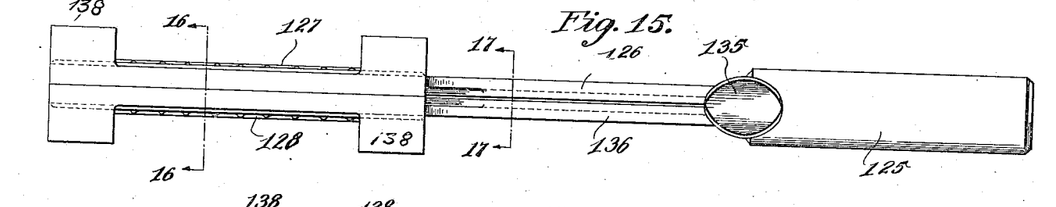
Figure 15 is a view of the utensil shown in Fig. 14 viewed from above in the position assumed when it is in the cooking chamber.
Figures 16, 17:
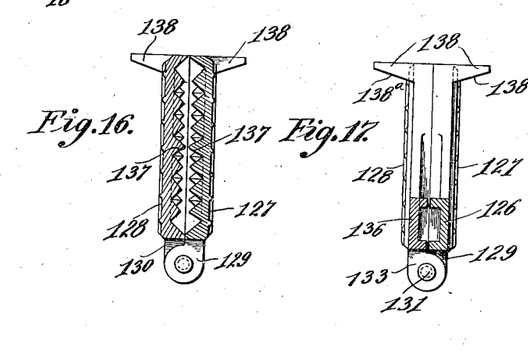
Figure 16 is a sectional view on the line 16—16 of Fig. 15.
Figure 17 is a section on line 17—17 of Fig. 15.
Figure 18:
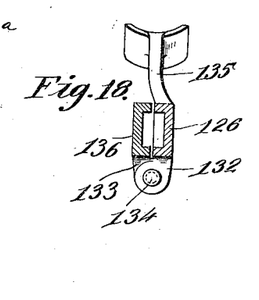
Figure 18 is a section on line 18—18 of Fig. 14.

Figs. 12 and 13 illustrate a modification of the cooking apparatus wherein the opposed members that constitute the burners and cooking chamber are adapted to expand laterally, so that a cooking receptacle of the double hinged pan type may be inserted between the flanges with a nice fit, and should the pans open by reason of the expansion of the food held between them, the members may yield and move apart accordingly.

In this form of the invention, the burner castings or members 105 are pivoted on parallel axes adjacent their lower edges. In order to provide suitable pivotal supports, gas pipes 116 are tapped into the header 117, within which gas coming from the main 19 through nozzle 117$^a$ is mixed with air admitted through the air ports 117$^b$, and said pipes 116 extend longitudinally through said members 105, identical drilled bosses 114 being formed at each end of said members for receiving said pipes. The outer closed end of each pipe 116 is supported in the front of casing 1 as indicated at 116$^a$. A spacing member 116$^b$ at one end, and a coiled spring 116$^c$ surrounding the pipe 116 at the other end, determines the position of the members 105 on the pipe and within the casing. The coiled springs 116$^c$ each having one end pressed against one of the bosses 114, force the burner castings yieldingly against the spacing rings 116$^b$, thus compensating for expansion and contraction caused by variations of heat and keeping the joints between the pipes 116 and the castings closed. Said pipes 116 pass through the burner chambers 106 and discharge gas thereinto through a longitudinal slot 116$^d$, or other outlets. Depending from the lower edge of each member 105 are lugs 110 provided with inward projecting bosses or spring seats 111, coiled expansion springs 112 being confined to said seats between the lugs, and tending to press the lugs apart so as to cause the members 105 to turn about the pipes 116 and their upper edges to move toward each other. Depending from the upper wall of casing 1 is a fixed stop 102, so disposed as to be engaged on opposite sides by stop arms 103 on members 105 as the upper edges of the members 105 approach each other, thus the springs 112 cannot force the upper edges together more than is indicated in Fig. 13. When the stop arms 103 are in contact with the fixed stop 102 the flanges 108, 108$^a$ should be spaced apart a distance substantially equal to the thickness of a waffle or broiler iron or like cooking receptacle to be inserted in the space between them. The cooking utensil is intended to be supported by lugs 138 thereon resting on top of flanges 108$^a$ as in the construction previously described. Should the pans of a cooking receptacle so disposed be pressed open by expansion of food held between the pans, the opposite members 105 will yield and permit such expansion while keeping the flanges 108 and 108$^a$ in reasonably snug contact with the marginal portions of the pans, thus tending to prevent a large amount of hot gas from escaping from the cooking chamber between the pan and the flanges. In this form of the invention the drip pan 4$^b$, drip pan opening 4$^a$, guiding flanges 108$^c$, brackets 108$^d$, and valve controlling means and pilot light are substantially the same as corresponding parts in the construction previously described.

The preferred form of cooking utensil or "iron" illustrated in Figs. 14 to 18 inclusive, comprises a pair of pans 127 and 128 having roughened interior surfaces preferably divided into two compartments by a rib 137. The pans are hinged together by means of hinge lugs 129 and 130 and pintles 131. Projecting from one pan, as 127, is a shank 126, to the end of which is secured a heat insulating handle 125. A shank 136 extends from pan 128 parallel with shank 126, and ends adjacent the inner end of the handle 125. Shank members 126 and 136 may be hinged together by the hinge lugs 132, 133 and pintle 134, the latter being in alinement with pintles 131. A thumb piece 135 projects from shank 131, to a position where it may be conveniently engaged by the thumb of the operator's hand grasping the handle 125. As in the other form of cooking utensil disclosed, the flanges opposite the hinges are sharp edged for the purpose of readily severing an excessive charge of meat or dough placed in the pan, or for cutting off a charge. Sustaining lugs 138, similar to those heretofore described, with inclined under sides 138$^a$, are carried by the margins of the pans. All metallic parts of each member, except the pintles, of the utensil, are preferably cast in one piece.

What I claim and desire to secure by Letters Patent is:

1. The combination of a cooking chamber having heating means therein at each side thereof, a broiling utensil comprising shallow members adapted to be opened and closed and spaced devices adapted to engage opposite sides of said broiler within the cooking chamber to hold it closed when in cooking position.

2. The combination with a cooking chamber having heating means therein at each side thereof, spaced supporting means in the upper side of said chamber, and a broiling utensil composed of shallow members pivoted together, said members having supporting elements, projecting oppositely, adapted to engage over the spaced supporting means, whereby the broiling utensil is suspended between the heating means and held closed by the spaced supporting means.

3. The combination of a cooking chamber provided with heaters therein at opposite sides thereof, and having a vertical opening in the front wall between the opposed heaters of less width than the chamber; a cooking receptacle comprising a pair of shallow pans adapted to retain food between them, said receptacle being of a thickness to fill approximately said vertical opening and means to sustain the receptacle within the chamber with the rear margin within said vertical opening.

4. The combination of a cooking chamber provided with heaters at opposite sides thereof, and having a vertical opening in the front wall of less width than the chamber and an opening in the bottom wall; a cooking receptacle comprising a pair of shallow pans adapted to retain food between them, said receptacle being of a thickness to fill approximately said vertical opening and means to sustain the receptacle between the heaters over the bottom opening with the rear margin within said front opening and a drip pan below said bottom opening wholly outside of said cooking chamber.

5. The combination of a cooking chamber provided with heaters at opposite sides thereof, said chamber being composed of two flanged sections spaced apart; a cooking receptacle comprising a pair of shallow pans adapted to retain food between them, said cooking receptacle being of a thickness to fill approximately the vertical openings between said front and rear flanges of said sections and means to sustain said receptacle with its front and rear margins within the space between said flanges.

6. The combination of a cooking chamber provided with heaters at opposite sides thereof, said chamber having a longitudinal opening in its upper wall between the heaters; a cooking receptacle comprising a pair of shallow pans adapted to retain food between them, and oppositely disposed means on the pans adapted to engage the upper side of the upper wall on opposite sides of said opening, whereby to sustain the receptacle between the heaters and keep the pans closed.

7. The combination of a cooking chamber provided with heating means at opposite sides thereof, said chamber having a longitudinal opening in its upper wall between the heating means, and a row of vent openings in said upper wall adjacent said longitudinal opening said upper wall being otherwise closed; a cooking receptacle comprising a pair of shallow pans adapted to retain food between them, and oppositely disposed means on the pans adapted to engage the upper side of the upper wall on opposite sides of said longitudinal opening whereby to sustain the receptacle between the burner orifices and keep the pans closed.

8. The combination of a cooking chamber provided with heating means at opposite sides thereof, said chamber having a longitudinal opening in its upper wall between the heating means, and vent notches in the margins of said upper wall adjacent said opening the upper wall being otherwise closed; a cooking receptacle comprising a pair of shallow pans adapted to retain food between them, and oppositely disposed means on the pans adapted to engage the upper side of the upper wall on opposite sides of said longitudinal opening whereby to sustain the receptacle between the burner orifices and keep the pans closed.

9. The combination of a cooking chamber provided with heating means at opposite sides, said chamber having spaced opposite flanges at the front thereof, providing an opening of less width than the chamber, and a longitudinal opening in the bottom of substantially the same width as the front opening; a cooking receptacle comprising a pair of pans adapted to retain food between them, said receptacle being of a thickness to fill approximately said front opening, means adapted to sustain said receptacle between the heating means, above the bottom opening, with the rear margin of the receptacle within said front opening.

10. In cooking apparatus, a member comprising a cooking chamber and a fuel gas chamber separated by an upright partition, said partition having burner orifices adjacent its lower edge the upper portion of the partition being imperforate, and means for conducting gas into said gas chamber.

11. A cooking apparatus comprising a casing, hollow castings arranged within said casing and in opposed relation, the inner walls of said castings having burner orifices, flanges extending at right angles from the inner walls to provide a cooking chamber, a cooking receptacle adapted to be inserted within said chamber between said flanges whereby the flame from the burner orifices in the walls will be directed upon opposite sides of the receptacle to thoroughly cook the contents thereof, said receptacle being of a size and thickness to substantially fill the spaces between the flanges, and means for supplying fuel to the hollow castings.

12. A cooking apparatus comprising a casing, hollow members having inner walls provided with heating means arranged in opposed relation within the casing, inwardly extending flanges formed on said members to provide a cooking chamber, yieldable means tending to force said members toward each other, and means for limiting the extent of possible inward movement of the members.

13. In cooking apparatus, a pair of opposed pivotally mounted flanged members spaced apart, each having heating means in opposed relation, and yielding means tending to turn the members about their respective pivots and cause their upper margins to approach each other.

14. In cooking apparatus, a pair of opposed flanged members spaced apart, each having a fuel chamber and burner orifices, parallel fuel conduits entering said fuel chambers, respectively, and discharging fuel thereinto, the members being mounted to rock on said conduits, spring means tending to rock said members about said conduits in such manner as to cause their upper margins to approach, and means to limit the extent of approaching movement.

15. The combination of a cooking chamber provided with heating means at opposite sides thereof, said chamber being composed of two flanged sections spaced apart, means for conducting a heating agent to the heating means, a controller disposed between the rear flanges of said sections, means for holding the controller normally in position to cut off the heating agent from the heaters, and a broiler of a thickness and size to enter said chamber and substantially fill the spaces between the flanges.

16. The combination of a cooking chamber provided with burner orifices in opposite sides thereof, said chamber being composed of two flanged sections spaced apart, a conduit for supplying fluid fuel to the burner orifices, a normally closed valve controlling the passage of fuel to the burner orifices, a valve operating lever having its end normally disposed in the space between said sections in the path of movement of a cooking receptacle being inserted between said sections.

17. The combination of a cooking chamber provided with burner orifices in opposite sides thereof, said chamber being composed of two flanged sections spaced apart, a conduit for supplying fluid fuel to the burner orifices, a valve for controlling the passage of fuel to the burner orifices, valve controlling means arranged to be operated by a cooking receptacle inserted between said sections, and a pilot burner disposed above the space between said sections.

18. The combination of a cooking chamber having heating means in its opposite sides, a vertical opening in its front wall, and a longitudinal opening in its upper wall, and guide flanges extended in the plane of the upper wall adapted to sustain and guide a cooking apparatus being inserted into the chamber, said guide flanges being formed so as to provide a flaring space adjacent their ends to guide a cooking receptacle into the chamber.

19. The combination of a casing having a vertical opening in its front wall, a cooking chamber within the casing having heating means at its opposite sides, a vertical opening in its front wall registering with the vertical opening in the casing and a longitudinal opening in its upper wall, and guide flanges extended in the plane of the upper wall of the chamber adapted to sustain and guide a cooking receptacle being inserted into the chamber, said guide flanges including a spaced bracket extending from the casing on each side of the vertical opening therein.

20. A cooking receptacle comprising a pair of shallow pans hinged together, said pans having sharp flanges at their free edges.

21. A cooking receptacle comprising a pair of shallow pans hinged together at adjoining edges, a shank having a handle and a means adjacent the handle whereby the pans may be opened and closed.

22. A cooking receptacle comprising a pair of shallow pans hinged together at adjoining edges, a shank attached to each pan, said shanks lying parallel, a handle on one shank and a thumb piece on the other shank in position to be manipulated by the hand seizing the handle.

23. A cooking receptacle comprising a pair of shallow pans hinged together, the edges of said pans opposite the hinges being provided with laterally projecting means to sustain the receptacle suspended.

24. A cooking receptacle comprising a pair of shallow pans hinged together, the free edges of said pans opposite the hinges being provided with laterally projecting lugs.

25. A cooking receptacle comprising a pair of shallow pans hinged together, the free edges of said pans opposite the hinges being provided with sustaining projections, the sides of said projection toward the hinges sloping from their base in a direction away from the hinges.

26. The combination of a heating means and spaced apart supporting devices adjacent the heating means, with a broiling receptacle comprising pans hinged together at one edge, each pan having a lateral projection adapted to rest on said supporting devices, whereby the receptacle is supported adjacent the heating means and held closed.

27. The combination of a heating means, spaced apart supporting devices adjacent the heating means, spaced guide members providing a flaring passage between them in alinement with the space between said supporting devices, a broiling receptacle comprising pans hinged together at one edge, each pan having a lateral projection adapted to rest on said guides and supporting devices, whereby the receptacle may be guided to the supporting devices and be held closed during the cooking operation.

In testimony whereof I affix my signature.

WAYNE DAVIES.